United States Patent
Reschke et al.

(10) Patent No.: US 12,491,815 B2
(45) Date of Patent: Dec. 9, 2025

(54) METHOD FOR OPERATING A MOTOR VEHICLE, AND MOTOR VEHICLE

(71) Applicant: AUDI AG, Ingolstadt (DE)

(72) Inventors: Johannes Reschke, Langquaid (DE); Werner Thomas, Münchsmünster (DE)

(73) Assignee: AUDI AG, Ingolstadt (DE)

( * ) Notice: Subject to any disclaimer, the term of this patent is extended or adjusted under 35 U.S.C. 154(b) by 69 days.

(21) Appl. No.: 18/681,124

(22) PCT Filed: Jul. 28, 2022

(86) PCT No.: PCT/EP2022/071204
§ 371 (c)(1),
(2) Date: Apr. 22, 2024

(87) PCT Pub. No.: WO2023/012028
PCT Pub. Date: Feb. 9, 2023

(65) Prior Publication Data
US 2025/0222860 A1 Jul. 10, 2025

(30) Foreign Application Priority Data
Aug. 6, 2021 (DE) ..................... 10 2021 120 530.1

(51) Int. Cl.
*B60Q 1/50* (2006.01)
*B60W 50/14* (2020.01)
*H04W 4/46* (2018.01)

(52) U.S. Cl.
CPC ........... *B60Q 1/545* (2022.05); *B60Q 1/5037* (2022.05); *B60W 50/14* (2013.01); *H04W 4/46* (2018.02);
(Continued)

(58) Field of Classification Search
CPC .. B60Q 1/545; B60Q 1/5037; B60Q 2400/20; B60Q 2400/50; B60Q 1/30;
(Continued)

(56) References Cited

U.S. PATENT DOCUMENTS

| 8,395,522 B2 * | 3/2013 | Kweon | .............. G01C 21/3697 455/445 |
| 10,152,886 B2 | 12/2018 | Weber | |

(Continued)

FOREIGN PATENT DOCUMENTS

| DE | 3003346 A1 | 8/1981 |
| DE | 102008020728 B4 | 6/2011 |

(Continued)

OTHER PUBLICATIONS

International Search Report and Written Opinion of the International Searching Authority directed to related International Patent Application No. PCT/EP2022/071204, mailed Nov. 18, 2022, with attached English-language translation; 20 pages.

*Primary Examiner* — Omeed Alizada
(74) *Attorney, Agent, or Firm* — Sterne, Kessler, Goldstein & Fox P.L.L.C.

(57) ABSTRACT

A method for operating a motor vehicle, in particular a passenger car, wherein the motor vehicle has a communication apparatus for receiving traffic light information transmitted from a traffic light and relating to the traffic light control of the traffic light, and a vehicle light arrangement having at least one vehicle light and assigned to the rear or the front or the sides of the vehicle. Each vehicle light is used to implement an operating light function relating to the operation of the motor vehicle. The at least one piece of the traffic light information and/or derived information that is derived therefrom and is independent of the motor vehicle is displayed to another road user by means of the vehicle light arrangement. The at least an activation and/or deactivation (Continued)

Figure 1:
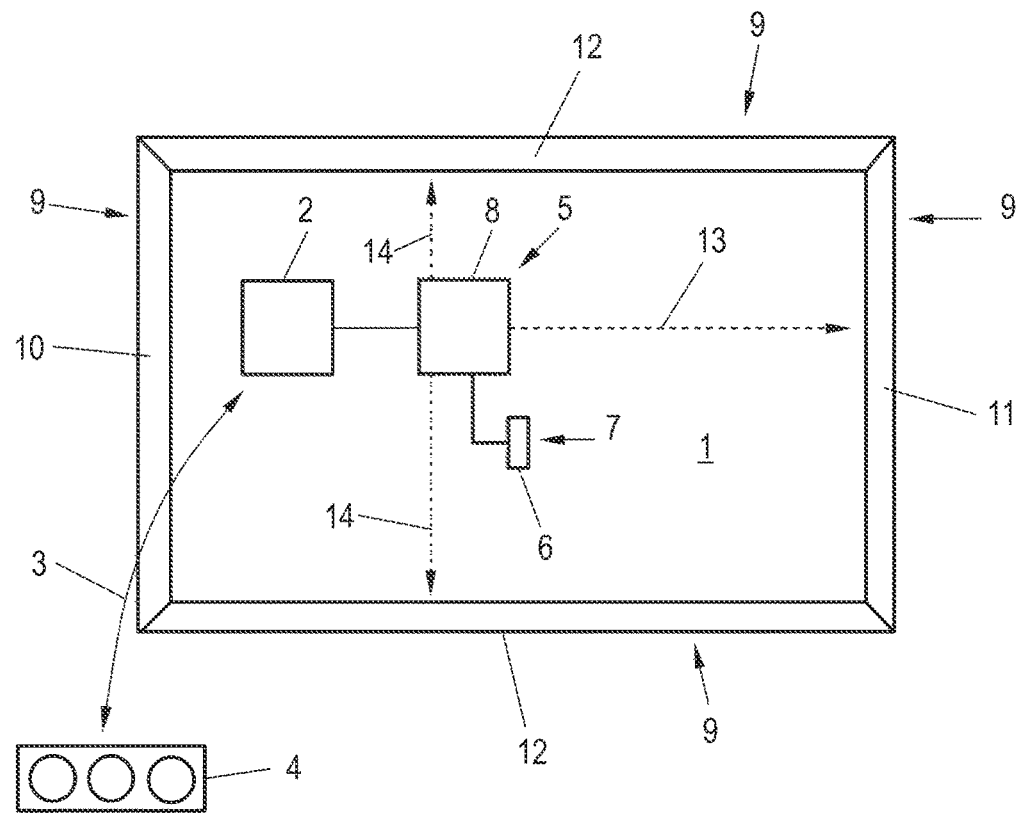

of the display of the at least one piece of information only takes place together with a change with respect to at least one of the at least one operating light function and/or when the motor vehicle is stationary.

15 Claims, 3 Drawing Sheets

(52) U.S. Cl.
CPC ... *B60Q 2400/20* (2013.01); *B60W 2050/146* (2013.01); *B60W 2555/60* (2020.02); *B60W 2556/45* (2020.02)

(58) Field of Classification Search
CPC ............. B60Q 2900/40; B60W 50/14; B60W 2050/146; B60W 2555/60; B60W 2556/45; H04W 4/46; G08G 1/096716; G08G 1/096783; G08G 1/095; G08G 1/09675
See application file for complete search history.

(56) References Cited

U.S. PATENT DOCUMENTS

| | | | |
|---|---|---|---|
| 10,529,229 | B2 | 1/2020 | Salter et al. |
| 10,602,331 | B2 | 3/2020 | Takii et al. |
| 10,605,422 | B2 | 3/2020 | Kastner-Jung et al. |
| 2013/0093890 | A1 | 4/2013 | Cunningham |
| 2019/0066510 | A1 | 2/2019 | Salter et al. |
| 2021/0174673 | A1* | 6/2021 | Mimura ........... G08G 1/096791 |

FOREIGN PATENT DOCUMENTS

| | | |
|---|---|---|
| DE | 102014226886 A1 | 6/2016 |
| DE | 102019200215 A1 | 7/2019 |
| FR | 3049526 A1 | 10/2017 |
| JP | 2006171831 A | 6/2006 |
| JP | 2011207348 A | 10/2011 |
| JP | 2020071790 A | 5/2020 |
| WO | WO 2010/066245 A1 | 6/2010 |

* cited by examiner

METHOD FOR OPERATING A MOTOR VEHICLE, AND MOTOR VEHICLE

TECHNICAL FIELD

The present disclosure relates to a method for operating a motor vehicle, in particular a passenger car, wherein the motor vehicle has a communication apparatus for receiving traffic light information transmitted from a traffic light and relating to the traffic light control of the traffic light, and a vehicle light arrangement having at least one vehicle light and assigned to the rear or the front or the sides of the vehicle, wherein each vehicle light is used to implement an operating light function relating to the operation of the motor vehicle. In addition, the present disclosure relates to a motor vehicle.

BACKGROUND

In modern motor vehicles, more and more communication apparatuses are being provided which enable information to be exchanged with other road users (motor vehicle-to-motor vehicle communication) or with infrastructure apparatuses (motor vehicle-to-X communication) in the region around the motor vehicle, in particular according to a motor vehicle-to-motor vehicle communication standard. Such types of communication are often also referred to as car-to-car (C2C) or car-to-X (C2X) communication, or vehicle-to-vehicle (V2V) or vehicle-to-X (V2X) communication. For example, a WLAN standard, for example 802.11p, can be used as a communication standard.

A useful application of motor vehicle-to-X communication is the communication of the motor vehicle with traffic lights or generally the receipt of traffic light information relating to their traffic light control. Examples of such traffic light functions are the time period until the next green light, the duration of traffic light phases, and in particular information that makes it possible to use a so-called "green wave" in the motor vehicle, and therefore to select a speed at which the passed traffic lights are green. The motor vehicle which receives the traffic light information can have a control apparatus which, for example, at least partially causes the display of the traffic light information or derived information derived therefrom on display means in the interior of the motor vehicle, for example by means of a human-machine interface (HMI). Derived information can, for example, contain a speed suitable for a green wave, but said information can also already be transmitted by the traffic light itself or an associated transmission apparatus. The provision of a speed suitable for a green wave to the driver is also referred to as a "traffic light phase assistant." However, traffic light information can also be used with regard to other motor vehicle systems, for example in start-stop systems for preparing an engine start, or the like.

Such functions for receiving and using traffic light information are equipment features that are not available to all road users. Therefore, only a limited portion of road users can make use of the fact that traffic lights or their associated transmission apparatuses provide traffic light information.

DE 10 2014 226 886 A1 relates to a method and to a device for controlling the flow of traffic, wherein the traffic light phase assistant, also referred to there as a "green light optimal speed advisory—GLOSA", is depicted as one of the core applications in V2X. It is recognized that a change in the driving behavior can result from such and other received infrastructure information, which is why it is proposed to output, in the event of a change in the driving behavior, an externally visible visualization which is to indicate that this change in the driving behavior is plausible.

DE 10 2019 200 215 A1 relates to a cross-vehicle communication system in which, when a message is sent wirelessly between vehicles, the transmitting is essentially visually identified vehicle for the recipient so that they can recognize from where the message was sent.

DE 30 03 346 A1 relates to a device for message transmission from vehicle to vehicle in road traffic, in which terms such as "Your vehicle is defective" and "Excuse me" can be signaled with corresponding means or elements via a hand or finger and/or foot control that automatically returns to the "off" position.

U.S. Pat. No. 10,529,229 B2 discloses a vehicle lighting assembly that is connected to a traffic system. In this case, a wireless signal is received from a traffic control apparatus which can be a traffic light, whereupon the motor vehicle lighting assembly is actuated to generate a light effect which is synchronized with a corresponding light effect of the traffic control apparatus. In particular, the light effect can contain a countdown to a change of state of the traffic control apparatus. The output on the radiator grille of the motor vehicle is directed at pedestrians who may be distracted.

U.S. Pat. No. 10,152,886 B2 relates to a traffic light warning system for a vehicle, wherein the traffic light is recorded by means of a camera, and a signal state of the traffic light is deduced from the recorded images. A display apparatus in the motor vehicle can represent a corresponding icon-like traffic light representation. In particular, VLC can also be used here. The orientation of the traffic light representation on the display can be changed between horizontal and vertical depending on the region.

US 2021/0174673 A1 relates to a device for presenting information of an autonomously driving vehicle. Received traffic light information are converted into an output at the rear of the motor vehicle which can comprise stop instructions, a warning about continued driving, or permission to continue driving.

WO 2010/066245 A1 relates to an organic light-emitting diode and lighting means having such organic light-emitting diodes, wherein the lighting means can in particular be the following devices or parts of the following devices: Alarm clock, shower cubicle, shower head, sunshade, rain shield, lamp, bag, signal light, changing room, privacy screen, housing, emergency lighting, mirror, tile, ceiling light, radiator cover, blind, noise protection, umbrella and warning light. The lighting means can also be integrated into the window of a motor vehicle or form a display device or a signal light of a motor vehicle.

US 2019/0066510 A1 relates to a computer that is programmed to determine a target region into which a symbol is projected based on the detection of a target object. The symbol that is projected can describe the status of a traffic light, for example, to draw the attention of inattentive pedestrians thereto, for example.

U.S. Pat. No. 8,395,522 B2 discloses an information display device and an associated method. In this case, a user is able to drive comfortably and safely by projecting broadcast information from a caller onto a windshield of the vehicle by means of a display unit, in particular a head-up display. The display is based on the vehicle speed.

US 2013/0093890 A1 relates to a vehicle data communication and display system. Data from at least one vehicle-external data source are received by means of a communication apparatus. A controller can control a vehicle display apparatus on the basis of data that were obtained from the communication apparatus. In particular, information about a traffic light are received and displayed inside the motor vehicle. The object of the present disclosure is to specify a novel, improved way to use traffic light information, from which, surrounding traffic can in particular also benefit.

BRIEF DESCRIPTION OF DRAWINGS/FIGURES

Figure 2:
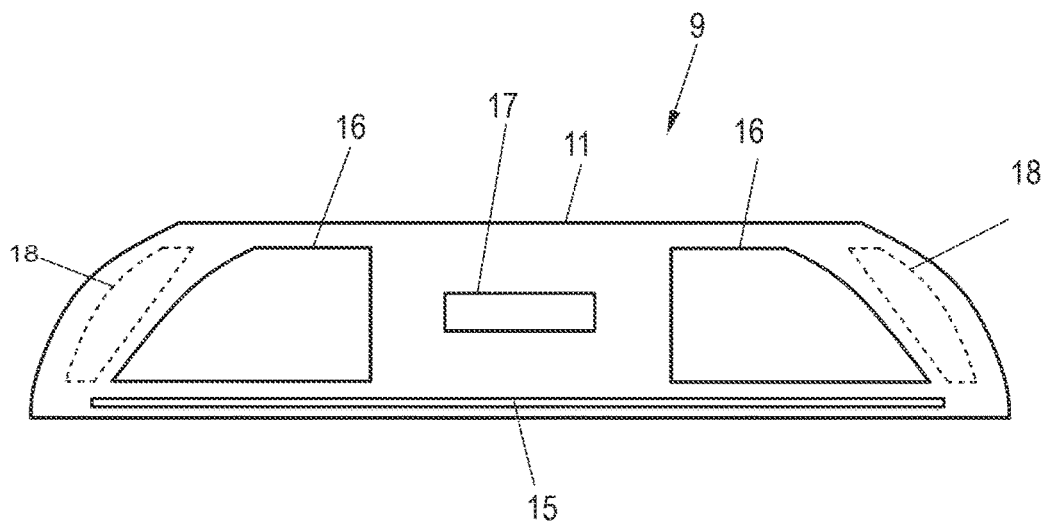
Figure 7:
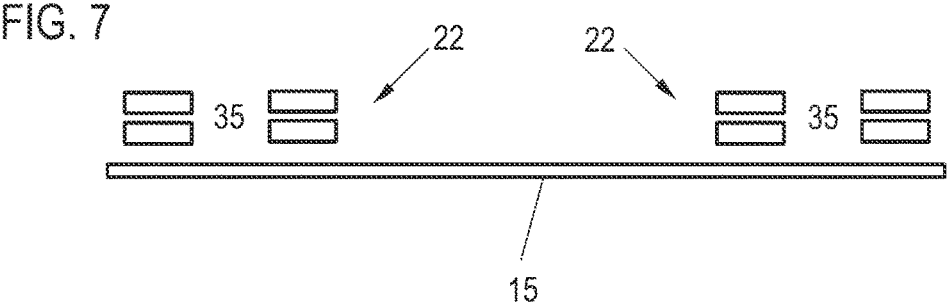
Figure 8:
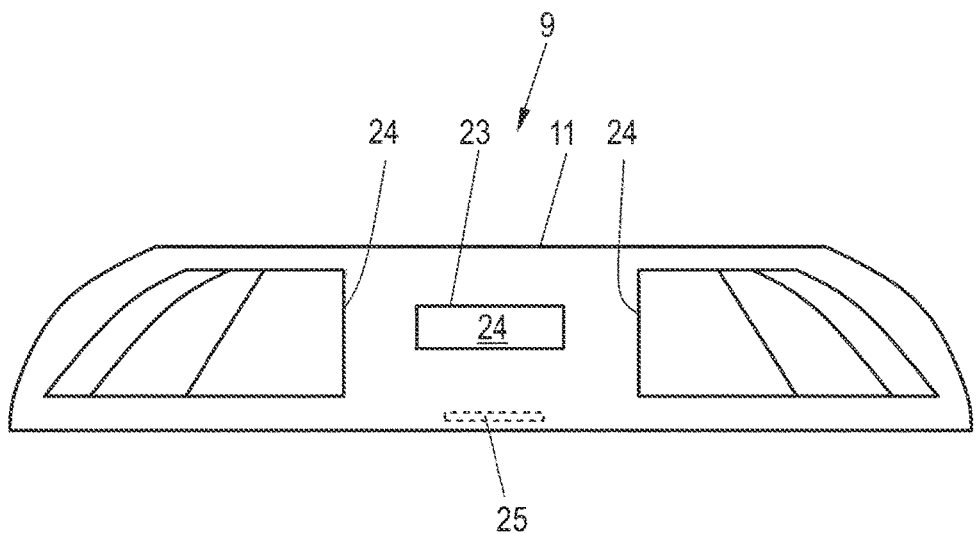
Figure 9:
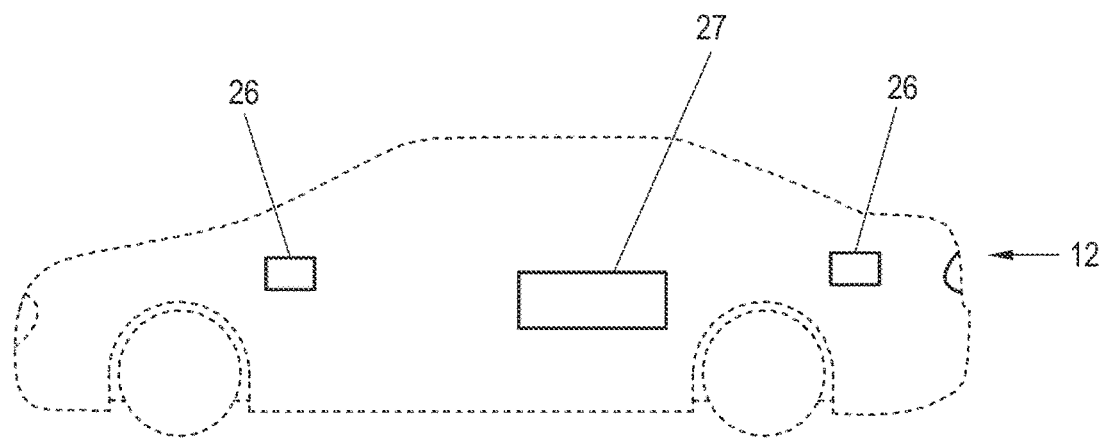

Additional advantages and details of the present disclosure are shown in the embodiments described hereinafter and from the drawings, In the figures:

FIG. 1 shows a schematic diagram of a motor vehicle according to the present disclosure, FIG. 2 schematically shows a vehicle lighting arrangement according to a first embodiment, FIGS. 3 to 6 show different appearances of the vehicle lighting arrangement for displaying a time period up to a green light, FIG. 7 shows an appearance of the vehicle lighting arrangement for displaying an ideal speed, FIG. 8 schematically shows a vehicle lighting arrangement according to a second embodiment, and FIG. 9 shows a schematic view of a vehicle lighting arrangement associated with the sides of the motor vehicle.

DETAILED DESCRIPTION

To solve this objective, the features of claim 1 are provided according to the present disclosure in a method of the type mentioned at the beginning.

At least pieces of the traffic light information or derived information can be passed on by means of the vehicle lighting arrangement to other road users so that the other road users, in particular other drivers, can also benefit from this traffic light information. In so doing, a period of time up to a green light and/or an ideal speed allowing a green wave is preferably displayed by means of the vehicle lighting arrangement as a piece of information. Other drivers can therefore be informed about pending changes to the traffic light control and/or the optimal speed for a green wave. The ideal speed permitting a green wave can also be exemplary derived information that is independent of the motor vehicle, but this ideal speed can also already be provided with the traffic light information.

By "forwarding" traffic light information or derived information to other, in particular at least the following, road users, the said road users' information base is significantly improved, which also results in an improvement in traffic flow, which in particular also leads to a reduction in carbon dioxide emissions. In addition, motor vehicles by the corresponding manufacturer are thereby more positively represented on the roads.

This therefore takes advantage of the fact that in modern motor vehicles, as an optional feature, it is possible to receive traffic light information and use it within the vehicle. In this case, for example, it can be provided that the traffic light information is displayed to the driver at least partially on a human-machine interface in the interior of the motor vehicle. For example, a recommended ideal speed for driving in a green wave can be displayed via the instrument cluster, in particular on an instrument panel, or it can be recommended to decelerate early because the traffic light can no longer be approached in the green phase. Additionally or alternatively, the driver can be shown the duration it takes to switch from red to green. Driver assistance systems designed in this way can, for example, be referred to as a traffic light phase assistant or "online traffic light info."

According to the present disclosure, it is now provided to also provide this traffic light information or derived information, which is currently reserved for the driver, at least partially to other road users by means of a visualization in at least one direction, preferably at least at the rear of the motor vehicle. As will be discussed in more detail below, existing vehicle lights, in particular those assigned to another operating light function, such as rear lights, can be used for this purpose, wherein it can, however, also be useful to use additional display devices or lights, such as displays and/or projection systems.

Communication with the traffic light (or a transmission apparatus associated with the traffic light) can preferably take place according to a motor vehicle-to-motor vehicle communication standard, in particular a WLAN standard such as 802.11p. In this context, the communication apparatus can of course also be designed to receive further communication information in addition to the traffic light information, for example from other motor vehicles and/or other communication apparatuses. Traffic light information are forwarded by the communication apparatus to the control apparatus carrying out the method, which in particular forms a driver assistance system (for example traffic light phase assistant or "online traffic light info") using the traffic light information, where it is used not only for being displayed to the driver and, if applicable, other purposes, but also processed in order to effect a corresponding actuation of the vehicle lighting arrangement. For example, the at least one piece of information can be used to generate corresponding actuation signals for the vehicle lighting arrangement.

In an expedient development of the present disclosure, it can be provided that the vehicle lighting arrangement comprises independently actuable lighting segments, wherein at least a first portion of the lighting segments is actuated to output the at least one piece of information. It can therefore be provided to visualize the piece of information, for example by switching individual lighting segments of the vehicle light arrangement on and off. Such lighting segments can have different sizes, so that in particular sufficiently small lighting segments can form pixels or image points of a display, for example, and therefore a display-like representation of more complex information, for example of symbols, numbers, letters, and/or the like, can also be provided by the use of such lighting segments.

In a particularly useful embodiment, it can be provided that a second portion of the lighting segments, which does not overlap with the first portion and in particular is completely encompassed by at least one of the at least one vehicle light assigned to a specific operating light function, is used to provide the operating light function assigned to the vehicle light, in particular a tail light function, and/or a position light function, and/or a daytime running light function of the motor vehicle. This means that a second portion of the lighting segments that is not to be used for the visualization of the at least one piece of information can be permanently assigned to the provision of a taillight function of the motor vehicle. In particular, provision can be made for the second portion of the lighting segments to be actuated to fulfill at least one specified light value requirement for the operating light function. Such light value requirements can be formulated in such a way that the operating light function is realized to fulfill its purpose, i.e. rear lights of the motor vehicle used as taillights, for example, are sufficiently clearly perceptible under corresponding conditions. Light value requirements can also arise from legal requirements. For example, a correspondingly necessary light intensity can thereby be ensured. Therefore, a constant lighting portion can be created, namely the second portion of the lighting segments, which meets the light value requirements, while a variable second portion serves to visualize the at least one piece of information. In this way, the forwarding of traffic light information and/or derived information is possible without impairing the operating light function, for example a taillight function which is usually provided at the rear.

Preferably, lighting segments of the at least one vehicle light and/or a dedicated display apparatus assigned the task of displaying the at least one piece of information, in particular an information display, and/or projection segments of a projection apparatus can be used at least partially as lighting segments of the first portion. As can be seen, depending on the requirements, there are thus different options with different advantages. If, for example, exclusively lighting segments of already existing vehicle lights, for example the rear light and/or at least one other function light, are used, it is possible to visualize the at least one piece of information without expanding the vehicle lighting arrangement. In this case, use is made of the fact that segmented vehicle lights, for example rear lights, have already been proposed in the prior art and are also often used in modern motor vehicles. These are designed in particular in such a way that not all of the lighting segments are required in order to satisfy the light value requirements, thus providing flexibility which can also advantageously be used for at least partial visualization of the at least one piece of information.

In addition, it can of course also be conceivable to provide and use additional display devices or projection devices within the scope of the method according to the present disclosure, wherein it is then preferred according to the present disclosure to add at least one information display, which can be arranged, for example, adjacently to at least one of the at least one vehicle light, as a display apparatus. Especially in the case of such an adjacent or at least partially enclosed arrangement of the display apparatus, in particular the information display, a particularly advantageous combination of lighting segments of the display apparatus and the rear light and/or functional light for forming the first portion is possible. An information display can provide, for example, better resolved information reproduction, for example for an easily legible representation of numbers, symbols and/or letters, such as the ideal speed.

An advantageous, specific technology in which the lighting segments can be provided is OLED technology. It can therefore be provided that the lighting segments are at least partially formed by OLED segments. Information displays which can be used as a dedicated display apparatus are also available in OLED technology.

According to the present disclosure, it is provided that at least an activation and/or deactivation of the display of the at least one piece of information takes place only together with a change with respect to at least one of the at least one operating light function, in particular a direction indicator function, and/or the tail light function, and/or the position light function, and/or the daytime running light function, and/or a brake light function, and/or when the motor vehicle is at a standstill. If necessary, but less preferred, a change in the display of the at least one piece of information can also take place only together with such a change. If a change occurs with respect to a light function relating to the operation of the motor vehicle, the attention of the other, for example following, road user is directed to the motor vehicle anyway so that they can also easily perceive the at least one piece of information. On the other hand, a restriction of the ability to activate or deactivate the display of the at least one piece of information to the existence of a change with regard to an operation-relevant light function can reduce irritation for other, for example following, road users, if they essentially associate changes in the lighting of the preceding motor vehicle with the notification of changes in its operation, for example. In addition, any existing or legally stipulated approval requirements can also be fulfilled in this way, according to which, for example, signatures resulting from vehicle lighting arrangement should only change if a light function relating to the operation of the motor vehicle causes a change, or if the motor vehicle is at a standstill. Standstill also offers an excellent opportunity for activation and/or deactivation, especially since this often occurs at traffic lights during the red phase in any case. The other, for example, following, road users who in principle do not expect anything from the preceding vehicle, become aware of the vehicle as a result of the activation and will intuitively notice the at least one piece of information. In addition, he will probably be at a standstill himself anyway, so that extremely reliable visualization is also provided.

As already mentioned, a time period until a green light and/or an ideal speed allowing a green wave to have proven to be pieces of information that can be usefully transmitted. In a specific, advantageous embodiment, it can be provided in this context that the time period is displayed as a countdown, in particular by means of lighting segments that are added and/or removed and/or in the form of a progress indicator, in particular an inverted progress indicator. For example, a plurality of lighting segments can be defined as a first portion to be used for visualizing this piece of information, which are then switched on or off one after the other towards the green phase, in particular in the manner of a progress indicator. The number of lighting segments used here can be more than three and/or less than ten, for example. In one specific embodiment, it can be provided that a first lighting segment is switched on if the time period to a green light is less than 10 seconds, a second lighting segment is switched on if the time period is less than 7.5 seconds, and a third lighting segment is switched on if the time period is less than 4 seconds.

With regard to the ideal speed, it is preferred, for example using an information display or lighting segments of a rear and/or functional light of high resolution, to visualize a corresponding number, preferably in addition to an associated symbol indicating the green wave. In a specific embodiment, the piece of information relating to the ideal speed can then be output, for example after displaying the time period until the green light in the same display region, so that the logical "follow-up information" is passed on almost immediately.

The at least one piece of information can expediently be displayed in a color used for at least one of the at least one operating light functions, in particular red for the tail light function. In this way, the at least one piece of information is passed on in a way that blends in visually with the overall picture and is less distracting, wherein any existing specifications regarding colors to be used on certain sides of the motor vehicle can also be maintained.

In addition to the method, the present disclosure also relates to a motor vehicle, in particular a passenger car, wherein the motor vehicle has a communication apparatus for receiving traffic light information transmitted from a traffic light and relating to the traffic light control of the traffic light, a vehicle light arrangement that has at least one vehicle light and is assigned to the rear or the front or the sides of the vehicle, wherein each vehicle light is used to implement an operating light function relating to the operation of the motor vehicle, and has a control apparatus, which is characterized in that the control apparatus is designed to carry out the method according to the present disclosure. All embodiments relating to the method according to the present disclosure can be analogously transferred to the motor vehicle according to the present disclosure, with which the advantages already cited can consequently also be achieved.

FIG. 1 shows a schematic diagram of a motor vehicle 1 according to the present disclosure. The motor vehicle 1 has a communication apparatus 2 for communication according to a motor vehicle-to-motor vehicle communication standard, for example 802.11p. In particular, the communication apparatus 2 enables the motor vehicle 1 to receive traffic light information from a traffic light 4, which is only indicated here, as indicated by the arrow 3. The traffic light information include, in particular, information on the timing of the traffic light control, for example on the changeover times and the duration of the respective traffic light phases, in particular the red phase and the green phase. The traffic light information can optionally also contain information regarding an ideal speed to reach a green wave, in particular coordinated with other traffic lights 4; other-wise, such ideal speeds can also be derived as derived information from the traffic light information within the motor vehicle 1, for example in a control apparatus 5 implemented here as a control unit 8, which receives the traffic light information.

In the present case, the control apparatus 5 forms, inter alia, a driver assistance system on the basis of the traffic light information, for example a traffic light phase assistant or an "online traffic light info" system. For this purpose, the traffic light information or derived information derived therefrom is displayed at least partially on an instrument panel 6 as part of a human-machine interface 7 (HMI). For example, the ideal speed can be output as a recommendation for a green wave, and how long a traffic light 4 will remain red for can be displayed to the driver.

The motor vehicle 1 also has various vehicle light arrangements 9 with various vehicle lights with which operating light functions relating to the operation of the motor vehicle 1 are implemented. In the present case, a front lighting arrangement 10 which can comprise, for example, front headlights as vehicle lights for a dimmed beam, a high beam, a parking light, and a position running light, is first shown, optionally also indicator lights for a direction indicator display. The rear lighting arrangement 11 predominantly comprises at least one rear light as a vehicle light which can be used to implement a taillight function, and/or brake light function, and/or position light function/daytime running light function. The rear lighting arrangement 11 can also comprise indicator lights for a direction indicator function. Finally, there also still exists a side lighting arrangement 12 assigned to the sides of the motor vehicle 1, which can, for example, include side position lights for a position light as vehicle lights.

According to the present disclosure, the control apparatus 5 is also designed in the present case to actuate at least the rear light arrangement 11, cf. arrow 13, in order to display at least a piece of the traffic light information and/or the derived information, which is also independent of the vehicle, to a following road user by means of the rear light arrangement 11. Something similar can also occur additionally or alternatively, but less preferably, see arrows 14, by actuating the side lighting arrangement 12 for laterally displaying the at least one piece of information.

In the embodiments shown here, a time period up to a green light and an ideal speed permitting a green wave are displayed as pieces of information, wherein the time period is preferably displayed as a countdown, the ideal speed is preferably displayed in the form of a number, in particular together with symbols.

FIG. 2 shows an example embodiment of the rear lighting arrangement 11 in a first embodiment. In the present case, the rear lighting assembly 11 comprises three rear lights 15, 16, wherein the elongated rear light 15 extending substantially over the entire rear is designed as an LED strip which has lighting segments which can be actuated independently in the form of individual LEDs. The rear lights 16 are OLED lights of a very high resolution which therefore have OLED segments as independently actuable lighting segments. A position light 17 is provided centrally as another vehicle light; indicator lights 18 for a direction indicator function can be provided at the sides. In any case, the rear lights 15, 16 serve a taillight function, but can also serve a brake light function, for example by shining brighter, as well as a daytime running light function and a position light function.

Figure 3:
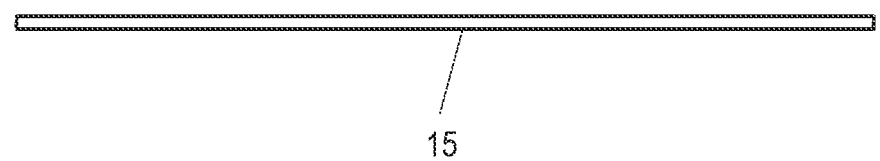

FIG. 3 to 6 now show a possible display of the time period up to the green light for a following road user. FIG. 3 shows the situation if the time period to the green light is even greater than 10 seconds. Then, only the rear light 15 is operated as an operating light function, predominantly for its taillight function. The lighting segments of the rear light 15 form a second portion of the lighting segments which is operated constantly to perform the taillight function, and thereby ensures that light value requirements are met, in particular a certain minimum light intensity is always provided. The lighting segments of the second portion are therefore permanently reserved for the operating light function, in this case the taillight function, so to speak, and are in particular operated constantly as long as the taillight function is active.

Figure 4:
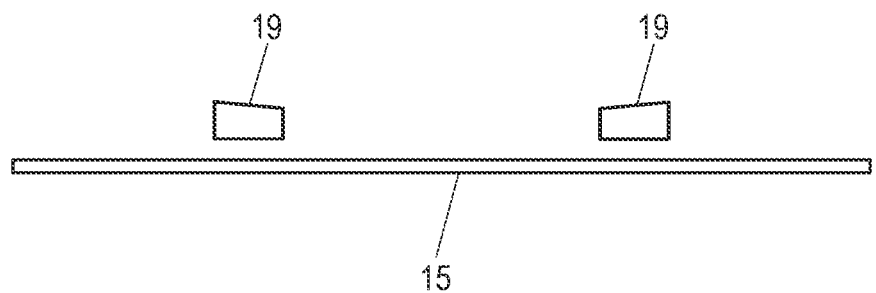

FIG. 4 shows the appearance of the rear lighting arrangement 11 at a second point in time at which the time period up to the green light is between 7.5 and 10 seconds. As can be seen, lighting segments 19 of the rear lights 16 have already been turned on in order to display the reduction in the time period compared to the point in time in FIG. 3.

Figure 5:
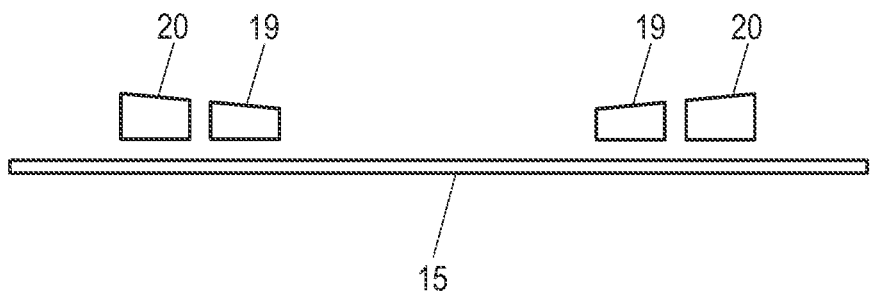
Figure 6:
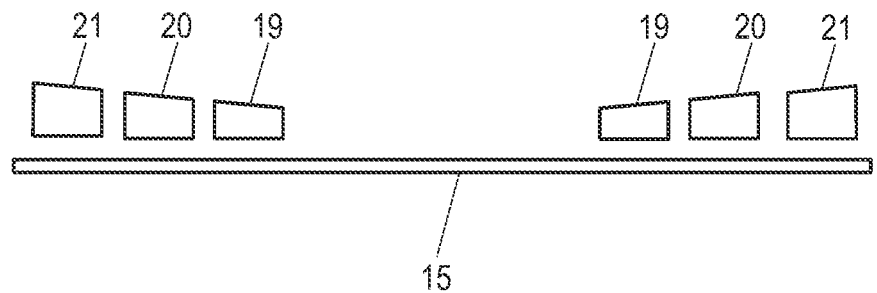

In the appearance in FIG. 5, the time period to the green light has fallen below 7.5 seconds, but is still greater than 4 seconds. Correspondingly, additional lighting segments 20 of the rear lights 16 were switched on toward the outside in the manner of a progress bar, whereupon lighting segments 21, which terminate the resulting progress indicator toward the outside, were also switched on by the control apparatus 5 when the time period until the green light fell below 4 seconds, as per FIG. 6. As can be seen, the lighting segments 19, 20, 21 become larger towards the outside in order to further increase the impression of a progress bar indicating an approaching event. Of course, more than three lighting segment groups can also be used for such a countdown display. It should be noted that in addition to switching lighting segments or lighting segment groups on or off, other types of countdowns are also possible, for example numbers counting down.

FIG. 7 shows an appearance for displaying the ideal speed at which the system can switch upon reaching the green phase, for example. The ideal speed, here 35 km/h, is displayed as a number between symbols (only shown schematically here), wherein the high resolution of the rear lights 16 is used to display the symbols and the numbers such that they are clearly legible by means of corresponding lighting segments 22.

The lighting segments 19, 20, 21, 22 also belong to a first portion of lighting segments of the rear lighting arrangement 11 which is used to display the piece of information and does not overlap with the second portion which is constantly used for the operating light function, in this case the tail light function.

In other embodiments, for example the second embodiment of a rear lighting arrangement 11 shown in FIG. 8, dedicated additional display apparatuses 23, here an information display 24, can also have been added for displaying the pieces of information. The embodiment also shows, purely by way of example as vehicle lights, combination lights 24 with portions for a taillight, brake light and direction indicator. Furthermore, an optional projection apparatus 25, which is only indicated here, is shown, via which pieces of information can also be projected onto the road behind the motor vehicle 1, although this is less preferable.

It should also be noted that it can generally be expedient in embodiments if an activation and/or deactivation of the display of the pieces of information takes place only together with a change with respect to an operating light function or when the motor vehicle 1 is at a standstill. This can prevent irritations of the other road user, for example.

FIG. 9 lastly shows, by way of example, a possible embodiment of a side lighting arrangement 12 which comprises position lights 26, 27 for each side as vehicle lights 3, wherein the position light 27 is likewise designed as an OLED light having lighting segments and can also be used to laterally output pieces of information.

Finally, it should also be noted that in all of the described embodiments, the pieces of information are displayed in a color also used for spatially adjacent operating light functions, for example in red for the rear light arrangement, and for example in orange or yellow for the side lighting assembly 12.

The invention claimed is:

1. A method for operating a motor vehicle, the method comprising:
   receiving, by a communication apparatus, from a traffic light, traffic light information, the traffic light information being related to traffic light control of the traffic light;
   implementing, by a vehicle light arrangement, at least one operating light function relating to an operation of the motor vehicle, the vehicle light arrangement being assigned to a rear, a front, or a side of the motor vehicle, wherein the vehicle light arrangement comprises at least one vehicle light; and
   displaying, by the vehicle light arrangement, to another road user, at least one piece of the traffic light information and/or derived information, the derived information being derived from the traffic light information and being independent of the motor vehicle,
   wherein an activation and/or a deactivation of the displaying the at least one piece of the traffic light information occurs only in conjunction with a change to the at least one operating light function.

2. The method of claim 1, further comprising communicating with the traffic light according to a vehicle-to-vehicle communication standard.

3. The method claim 1, further comprising controlling a first portion of lighting segments of the vehicle light arrangement to output the at least one piece of the traffic light information, wherein each of the lighting segments is independently controllable.

4. The method of claim 3, wherein the implementing the at least one operating light function includes using a second portion of the lighting segments, the second portion not overlapping with the first portion, and the second portion being completely encompassed by the at least one vehicle light assigned to the at least one operating light function.

5. The method of claim 4, further comprising controlling the second portion of the lighting segments to fulfill at least one light value requirement for the at least one operating light function.

6. The method of claim 3, further comprising using the lighting segments of the at least one vehicle light, and/or a dedicated display apparatus that is assigned a task of displaying the at least piece of the traffic light information, and/or projection segments of a projection apparatus as the first portion of the lighting segments.

7. The method of claim 3, wherein the lighting segments are at least partially formed by organic light emitting diode (OLED) segments.

8. The method of claim 1, wherein the at least one operating light function is a direction indicator function, and/or a taillight function, and/or a position light function, and/or a daytime running light function, and/or a brake light function.

9. The method of claim 1, wherein a period of time up to a green light and/or an ideal speed permitting a green wave is the at least one piece of the traffic light information.

10. The method of claim 9, further comprising displaying the period of time as a countdown.

11. The method of claim 1, wherein the displaying the at least one piece of the traffic light information includes using a color used for the operating light function.

12. The method of claim 1, wherein the displaying the at least one piece of the traffic light information and/or the derived information includes also displaying, to a driver, using at least partially a human-machine interface in an interior of the motor vehicle.

13. The method of claim 1, wherein the displaying being activated and/or being deactivated in conjunction with the change to the at least one operating light function, is also in conjunction with the motor vehicle being stationary.

14. A motor vehicle comprising:
   a communication apparatus configured to receive traffic light information transmitted from a traffic light, the traffic light information being related to traffic light control of the traffic light;
   a vehicle light arrangement comprising at least one vehicle light, the vehicle light arrangement being assigned to a rear, a front, or a side of the motor vehicle, wherein the vehicle light arrangement is configured to implement at least one operating light function related to an operation of the motor vehicle; and
   a control apparatus configured to actuate the vehicle light arrangement to:
      display, by the vehicle light arrangement, to another road user, at least one piece of the traffic light information and/or derived information, the derived information being derived from the traffic light information and being independent of the motor vehicle,
      wherein an activation and/or a deactivation of the display of the at least one piece of the traffic light information occurs only in conjunction with a change to the at least one operating light function.

15. The method of claim 9, further comprising displaying the period of time in the form of a progress indicator, wherein the progress indicator is an inverted progress indicator.

* * * * *